(No Model.)

A. J. ROBINSON.
LUBRICATING DEVICE.

No. 376,966. Patented Jan. 24, 1888.

Attest:
Wm. E. Woodward Jr,
Wm. E. Woodward,

Inventor:
Aaron J. Robinson,
per Edw. Dummer,
Atty.

UNITED STATES PATENT OFFICE.

AARON J. ROBINSON, OF FREMONT, NEW HAMPSHIRE.

LUBRICATING DEVICE.

SPECIFICATION forming part of Letters Patent No. 376,966, dated January 24, 1888.

Application filed April 30, 1887. Serial No. 236,717. (No model.)

*To all whom it may concern:*

Be it known that I, AARON J. ROBINSON, a citizen of the United States, residing at Fremont, in the county of Rockingham and State of New Hampshire, have invented a new and useful Lubricating Device, of which the following is a specification, reference being had to the accompanying drawings.

My invention relates to a device especially adapted for lubricating the bearing of a loose pulley supported by a shaft; and it consists in the mechanism, substantially as hereinafter described, and specifically pointed out in the claims.

Figure 1:
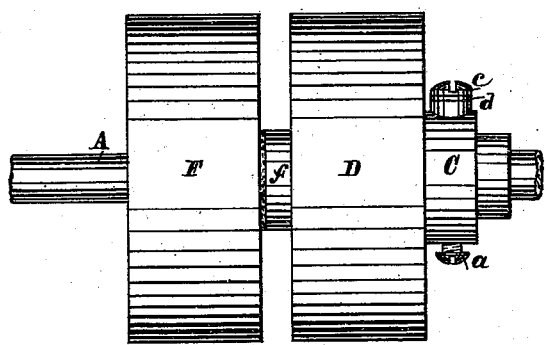
Figure 2:
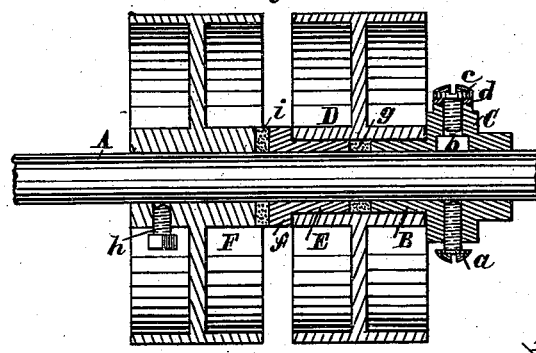
Figure 3:
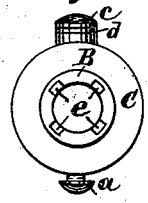
Figure 4:
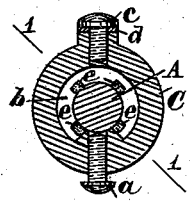
Figure 5:
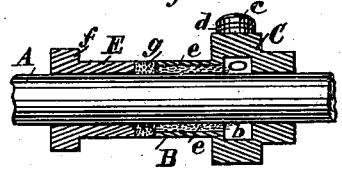

In the drawings, Figure 1 is an external view of a device embodying my invention, showing the application of the same. Fig. 2 shows a longitudinal central section. Fig. 3 shows an end view of the bushing B and the oil-reservoir. Fig. 4 is a transverse section of the oil-reservoir and shaft. Fig. 5 shows a longitudinal section of the bushing B and the oil-reservoir, taken on line 1 1 in Fig. 4.

On the shaft A, I secure—as by means of a set-screw, a—a bushing, B, having combined therewith an oil-reservoir, C. The reservoir may have exteriorly the form of a collar, as shown, and is hollowed out to form a chamber, b. Oil may be poured into this chamber through an opening, which may be closed by means of a screw, c, a washer, d, of leather or other like material, under the head of the screw preventing leakage around the screw. Channels or holes e are formed in the interior of the bushing B, which extend from the chamber b to the end of this bushing. On this bushing is located the pulley D, which is to run loosely thereon and on another bushing, E, placed on the shaft within the hub of the pulley. A shoulder, f, on the bushing E meets one end of the hub of the pulley, while a wall of the reservoir C, which forms a shoulder for the bushing B, meets the other end of said hub. The bushings B and E are of such length with reference to each other and the hub of the pulley that there is a space between the inner ends of the two bushings within the hub, and preferably about midway the length thereof. This space I fill with absorbent material g, like cotton wicking, which material I prefer to have extend through the channels e to the chamber b.

A pulley, F, fixed to the shaft—as by means of a set-screw, h—is generally employed in connection with a pulley loose on the shaft. I insert, between the hub of the fixed pulley and the outer end of the bushing E, packing i, which prevents the escape of oil from between this bushing and the shaft. When the fixed pulley is not required, a collar fixed on the shaft may take the place thereof.

The operation and effect of my device are obvious. There being oil in the chamber b, it will percolate through the channels e and absorbent material g, as required, lubricating the interior surface of the hub of the pulley D and the exterior surface of that portion of the bushings B and E forming the bearing for this pulley. The escape of oil from and entrance of foreign substances to the interior of the hub are prevented by the shoulders on the bushings and the packing i.

Instead of having the channels e in the bushing they may be made in the shaft.

I claim as my invention—

1. A bearing for a loose pulley formed of two bushings, one of which has channels e, leading to a space between the inner ends of the bushings, substantially as specified.

2. The combination of the bushings B and E, oil-reservoir C, shaft A, and pulley D, one of the bushings being provided with channels e, substantially as and for the purposes set forth.

3. The combination of shaft A, bushing B, provided with channels e, oil-reservoir C, bushing E, and absorbent material g between the inner ends of said bushings, substantially as set forth.

4. The combination of shaft A, oil-reservoir C, bushing B, provided with channels e, bushing E, pulley D, loose on the shaft, pulley F, fixed on the shaft, and packing i, substantially as described.

AARON J. ROBINSON.

Witnesses:
WM. E. WOODWARD, Jr.,
EDW. DUMMER.